United States Patent [19]

Zampini

[11] Patent Number: 4,484,935
[45] Date of Patent: Nov. 27, 1984

[54] PERMEATION MODIFIED MEMBRANE

[75] Inventor: Anthony Zampini, St. Louis, Mo.

[73] Assignee: Monsanto Company, St. Louis, Mo.

[21] Appl. No.: 509,612

[22] Filed: Jun. 30, 1983

[51] Int. Cl.³ .......................................... B01D 53/22
[52] U.S. Cl. .................................................. 55/158
[58] Field of Search .......................... 55/16, 68, 158; 210/500.2

[56] References Cited

U.S. PATENT DOCUMENTS

| | | | |
|---|---|---|---|
| 4,029,582 | 6/1977 | Ishii et al. | 55/16 X |
| 4,157,960 | 6/1979 | Chang et al. | 55/16 X |
| 4,214,020 | 7/1980 | Ward et al. | 55/16 X |
| 4,230,463 | 10/1980 | Henis et al. | 55/68 X |
| 4,239,793 | 12/1980 | Matsuura et al. | 55/16 X |
| 4,393,113 | 7/1983 | Suqie et al. | 55/16 X |
| 4,410,338 | 10/1983 | Yamamoto et al. | 55/16 X |

*Primary Examiner*—Robert Spitzer
*Attorney, Agent, or Firm*—R. L. Broad

[57] ABSTRACT

A multicomponent membrane having improved permeation characteristics for separation of one gas from a mixture of gases by permeation of the one gas through the membrane. The membrane is in the form of a porous, anisotropic substrate membrane and a coating in contact with the substrate membrane, the coating being made of poly(dimethyl siloxane), containing 1 to 20 weight percent of a permeation-modifying radical selected from the group consisting of

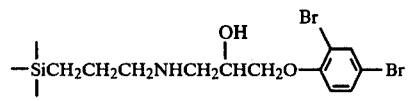

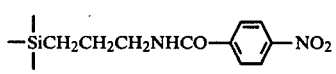

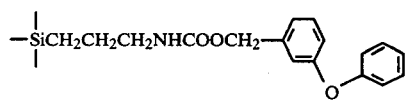

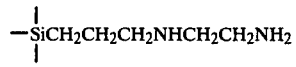

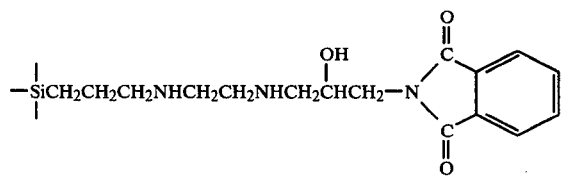

-continued

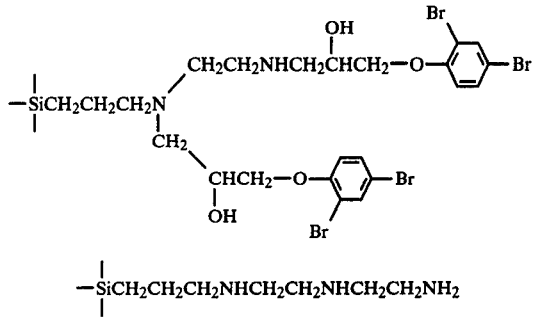

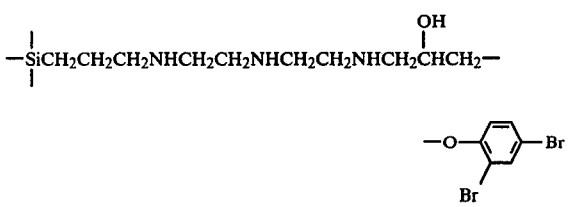

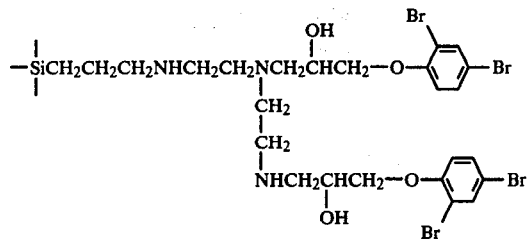

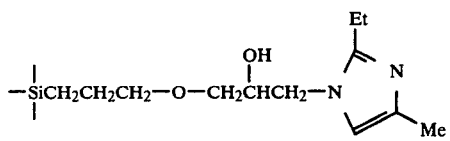

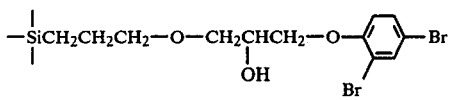

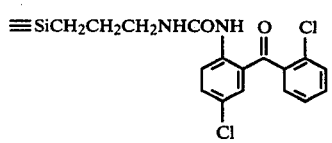

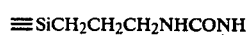

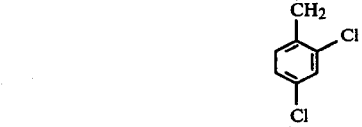

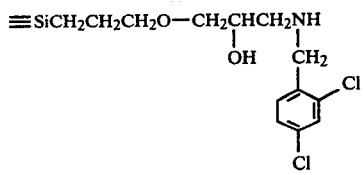

-continued
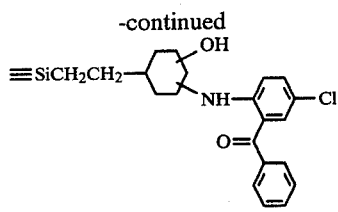
The coating is applied to the substrate in the form of a solution of 0.05 to 1 weight percent of the coating in a suitable solvent such as pentane.
9 Claims, No Drawings

PERMEATION MODIFIED MEMBRANE

BACKGROUND OF THE INVENTION

1. Field of the Invention

This invention relates to multicomponent membranes for gas separations.

2. Prior Art

Membranes suitable for separating one gas from a mixture of gases are known, including multicomponent membranes formed as hollow fibers and made up of a porous substrate layer supporting a thinner and less porous layer. In any type of membrane to be used for gas separations, it is desirable that the membrane have the highest permeability possible for the one gas to be separated from the mixture and the greatest separation factor for that gas with respect to other gases of the mixture. In other words, the one gas to be separated should permeate the membrane at the highest possible rate, while the other gases of the mixture should permeate the membrane at the lowest possible rate. Unfortunately, any gains made in increasing either the permeability or the separation factor of the membrane usually result in a reduction of the other. It would be desirable to improve either one of the permeability or separation factor of the membrane without sacrificing the other.

U.S. Pat. No. 4,230,463 discloses a multicomponent membrane which is in the form of a hollow fiber, the hollow fiber consisting of a porous substrate layer and a thinner less porous layer on the substrate layer. In preferred examples, the substrate layer is polysulfone and the coating layer is poly(dimethyl siloxane).

SUMMARY OF THE INVENTION

A multicomponent membrane for gas separation wherein the membrane is made up of a porous substrate membrane carrying a coating of poly(dimethyl siloxane) containing 1 to 20 parts per 100 parts of poly(dimethylsiloxane) of a permeation modifying radical selected from the group consisting of

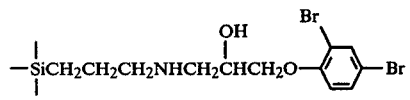

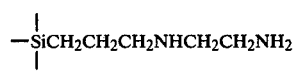

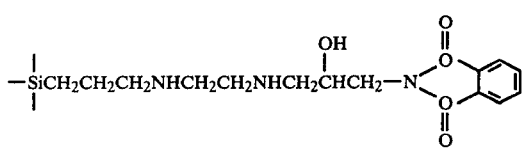

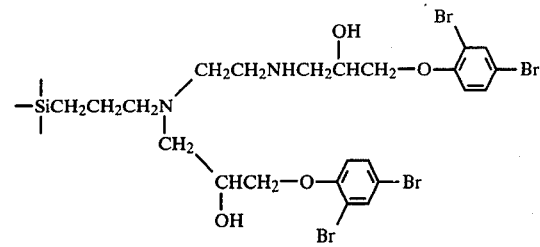

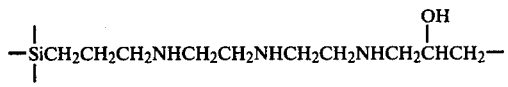

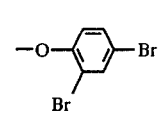

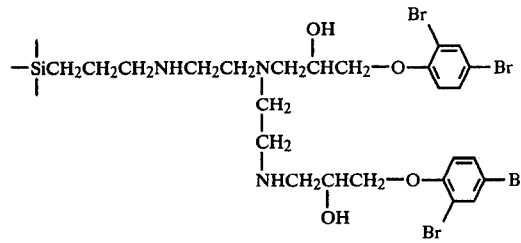

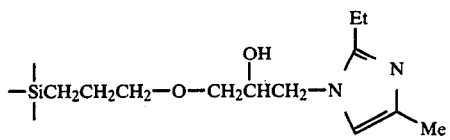

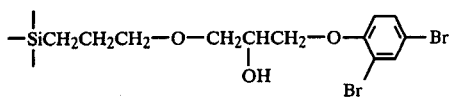

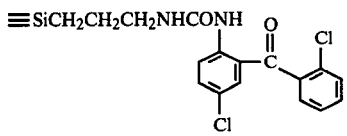

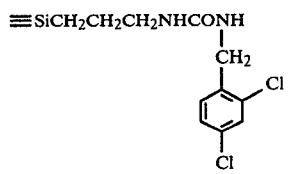

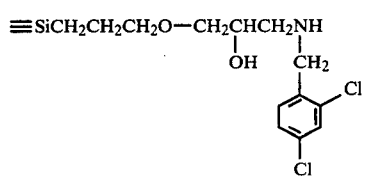

-continued

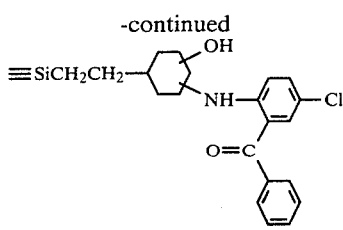

The coating is applied to the substrate in the form of a solution of 0.05 to 1 weight percent of the coating in a solvent such as pentane.

DETAILED DESCRIPTION OF THE INVENTION

The multicomponent membrane of this invention is useful in separating one gas from a mixture of gases. For example, the membrane is useful in separating oxygen from nitrogen and hydrogen from at least one of carbon monoxide, carbon dioxide, nitrogen, oxygen, argon, nitrous oxide and $C_1$-$C_5$ hydrocarbons, especially methane, ethane and ethylene. Various mixtures of these and other gases are frequently found in commercial processes.

The separation of one gas from a mixture is effected by the virtue of the fact that the membrane is more permeable to that one gas than other gases of the mixture. In carrying out the separation process, the mixture of gases is brought into contact with one side of the membrane, at a suitable pressure differential across the membrane, and the more permeable, or "faster", gas permeates the membrane and is recovered from the other side thereof. When the membrane is in the form of a hollow fiber, one side is the outer surface of the fiber and the other side is the internal or bore surface of the fiber.

For a given cross-sectional area of a given membrane, the rate of recovery of the faster gas and the purity of the recovered gas is determined by the pressure differential maintained across the membrane and the ratio of the permeability of the faster gas with respect to the other gases of the mixture. The higher the permeability of the faster gas, with respect to the other gases of the mixture, the more effective will be the separation process.

Since it is desired to separate one gas from a mixture of gases, the ideal would be to use a membrane which would permeate the one gas at a very high rate and which would not permeate the other gases of the mixture at all, i.e., a membrane which would have both a very high permeation rate for the one gas and a very high separation ratio or factor for the one gas with respect to the other gases of the mixture. Unfortunately, known membranes do not meet this ideal. In known membranes, the permeation rate for a given gas generally varies inversely with the separation factor, so that improvements in the separation factor, or selectivity, generally result in sacrifices in the permeation rate of the membrane. It would be desirable to have a membrane in which the separation factor could be increased without a corresponding decrease in the permeability of the faster gas. That is what this invention provides.

The multicomponent membrane of this invention is made up of a polymeric substrate membrane and a coating in contact with the substrate, the coating containing a permeation modifying radical selected from the group disclosed herein. The substrate membrane is preferably in the form of a hollow fiber made from a polysulfone polymer, such as the type described in U.S. Pat. No. 4,230,463.

The substrate membrane is preferably in the form of a hollow fiber having an outside diameter of about 200 to 1000 microns and a wall thickness of about 50 to 300 microns. The polysulfone substrate membrane is porous, the average pore cross-sectional diameter varying within the range of 5 to 20,000 Angstroms. The pore sizes are greater in the interior of the membrane and lesser near the surfaces of the membrane, such that the membrane is anisotropic. The porosity of the substrate membrane is sufficient that the void volume of this membrane is within the range of 10 to 90, preferably about 30 to 70, percent based on the superficial volume, i.e., the volume contained within the gross dimensions of the porous separation membrane.

The coating, which has a thickness of 5,000 Angstroms to 50 microns, is a silanol-terminated poly(dimethyl siloxane), or dimethyl siloxane diol, containing 1 to 20 parts of a permeation modifying radical as defined herein, based on 100 parts of the dimethyl siloxane diol, with the coating being in a cured state to chemically bond the radical to the poly(dimethyl siloxane) while at the same time cross-linking the poly(dimethyl siloxane). In other words, the coating is the condensation product of silanol-terminated poly(dimethyl siloxane) and a radical as defined herein. The invention herein does not lie in the cross-linking of the coating but in the interaction of the pendant portion of the radical with the porous substrate.

In addition to the poly(dimethyl siloxane) diol and the permeation modifying radical, the coating formulations will contain about 1 to 3 parts, based on 100 parts of dimethyl siloxane diol, of a suitable catalyst such as dibutyltin dilaurate, tin octoate or dibutyltin diacetate.

The permeation modifying radical is selected from the group

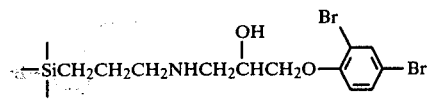

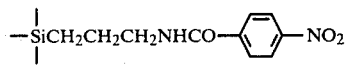

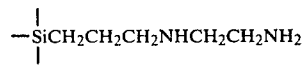

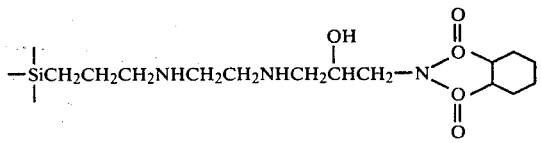

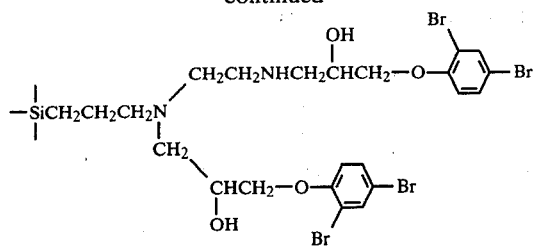

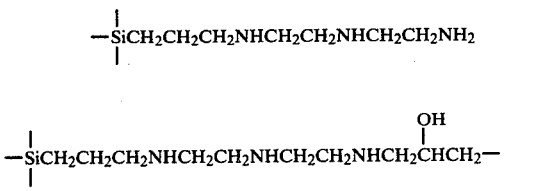

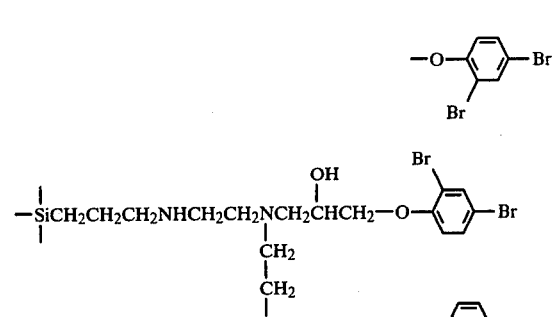

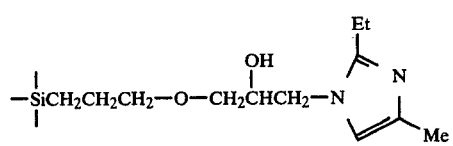

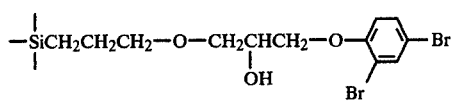

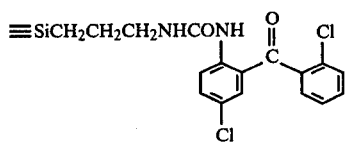

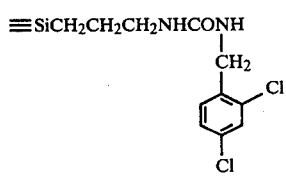

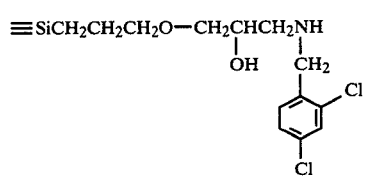

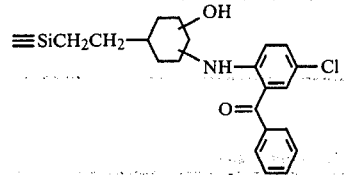

Prior to reacting the siloxane diol with the permeation modifying radical, this radical will have methoxy, ethoxy or acetoxy groups attached to the silicon atom of the radical.

The coating is applied to the substrate in the form of a solution of the coating in a suitble solvent such as pentane. The solution should contain 0.01 to 5 weight percent of the coating, with the preferred concentration of the coating solution being 0.05 to 1 weight percent of the coating in the solvent.

The coating is preferably applied by dipping the substrate, preferably in the form of hollow fibers, in the coating solution and then removing the coated substrate and allowing it to dry at ambient conditions. The reaction between the siloxane diol and the permeation modifying radical, which occurs during drying, provides a condensation product of dimethyl siloxane diol and the permeation modifying radical.

The interaction of the pendant portion of the permeation modifying radical with the surface of the substrate membrane is not fully understood but it is believed that this pendant end somehow bonds to or is attracted to the surface of the substrate membrane to significantly increase the separation factor of the membrane without at the same time significantly decreasing the permeation rate of the membrane. Very small amounts of the permeation modifying radical can be used. It has been found that a solution of well below 1 weight percent of the coating in the solvent will produce beneficial results. The amount of the permeation modifying radical which should be used varies from about 1 to 20 parts per hundred parts of dimethyl siloxane diol, with the preferred amount being 2 to 12 parts per hundred.

EXAMPLES

Polysulfone substrate membranes of the type defined herein, in the form of hollow fibers, were coated with poly(dimethyl siloxane) diol having a molecular weight of about 100,000 with 10 parts per 100 of the permeation modifying radicals defined herein and 2 parts per hundred of dibutyltin dilaurate as a catalyst, based on 100 parts of dimethyl siloxane diol. The silicones were dissolved in sufficient pentane to make a 0.1 to 1 weight percent solution to make the coating formulation.

The fibers were dipped 2 to 3 times in the coating formulation while a vacuum was applied to the bores of the fibers. The dips were spaced apart 10 to 20 seconds and each dip lasted from 1 to 10 seconds. The coating was then allowed to cure at room temperature. After the coating was cured, the permeabilities of the membranes with respect to hydrogen [(P/l)H$_2$] and the separation factors ($\alpha$H$_2$/CO) of the membranes, as a ratio of the permeability of hydrogen to carbon monoxide were determined in a conventional manner.

These measurements to determine permeabilities and separation factors were made at various periods after the fibers had been coated, this time interval being indicated under the column "No. of Days" in Table 1. The purpose of measuring these properties after delays of varying numbers of days is to show the stability of the coatings.

Table 1 shows the amount of the coating solids in the coating solution. Table 1 also shows the measured permeabilities and separation factors.

TABLE 1

| Permeation-Modifying Radical | Wt. % Coating Concentration | $P/l_{H_2} \times 10^6$ | $H_2$ $\alpha_{CO}$ | No. of Days |
|---|---|---|---|---|
| ≡SiCH₂CH₂CH₂NHCH₂CHCH₂O—C₆H₃(Br)₂ (OH) | 1 | 69 | 55 | 0 |
| ≡SiCH₂CH₂CH₂NHCO—C₆H₄—NO₂ | 1 | 64 | 42 | 17 |
| ≡SiCH₂CH₂CH₂NHCOOCH₂—C₆H₄—O—C₆H₅ | 1 | 64 | 36 | 16 |
| ≡SiCH₂CH₂CH₂NHCH₂CH₂NH₂ | 1 | 62 | 42 | 1 |
| ≡SiCH₂CH₂CH₂NHCH₂CH₂NHCH₂CHCH₂—N(phthalimide) (OH) | 1 | 49 | 56 | 34 |
| ≡SiCH₂CH₂CH₂N(CH₂CH₂NHCH₂CHCH₂—O—C₆H₃Br₂)(CH₂CHCH₂—O—C₆H₃Br₂) (OH)(OH) | 1<br>0.1 | 37<br>75 | 80<br>48 | 33<br>32 |
| ≡SiCH₂CH₂CH₂NHCH₂CH₂NHCH₂CH₂NH₂ | 1 | 35 | 45 | 4 |
| ≡SiCH₂CH₂CH₂NHCH₂CH₂NHCH₂CH₂NHCH₂CHCH₂—O—C₆H₃Br₂ (OH) | 1<br>0.4<br>0.1 | 17<br>40<br>66 | 109<br>62<br>51 | 34<br>34<br>34 |
| ≡SiCH₂CH₂CH₂NHCH₂CH₂N(CH₂CHCH₂—O—C₆H₃Br₂)(CH₂CH₂NHCH₂CHCH₂—O—C₆H₃Br₂) (OH)(OH) | 1<br>0.1 | 26<br>57 | 105<br>52 | 32<br>32 |

TABLE 1-continued

| Permeation-Modifying Radical | Coated Properties | | | |
|---|---|---|---|---|
| | Wt. % Coating Concentration | $P/l_{H_2} \times 10^6$ | $H_2$ $\alpha_{CO}$ | No. of Days |
| 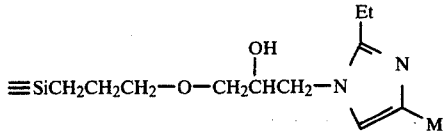 | 1 | 64 | 42 | 20 |
| 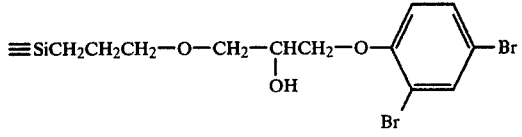 | 1<br>0.1 | 63<br>89 | 43<br>35 | 29<br>29 |
| 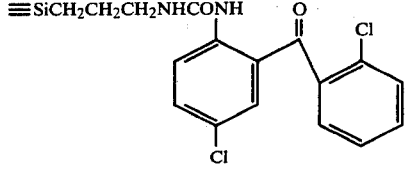 | 1 | 55 | 53 | 2 |
| 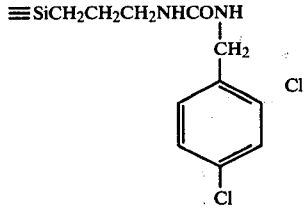 | 1 | 69 | 42 | 2 |
| 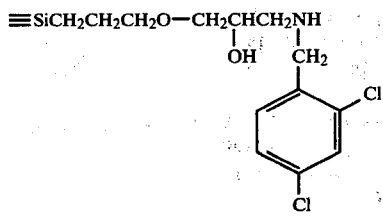 | 1 | 53 | 43 | 2 |
| 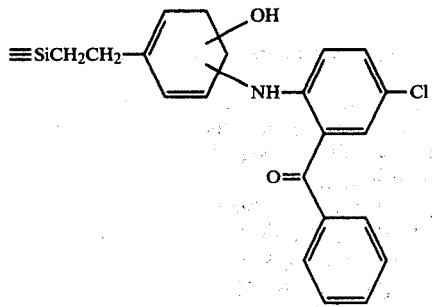 | 1 | 50 | 59 | 2 |

I claim:

1. A multicomponent membrane for gas separations, comprising
   a. a porous substrate membrane, and
   b. a coating of poly(dimethyl siloxane) in contact with said membrane, said coating containing 1 to 20 parts per hundred, based on 100 parts of said poly(dimethyl siloxane), of a permeation modifying radical bonded to said poly(dimethyl siloxane), said permeation modifying radical being selected from the group consisting of

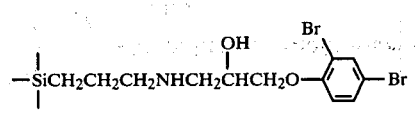

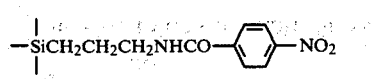

-continued

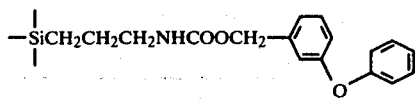

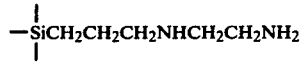

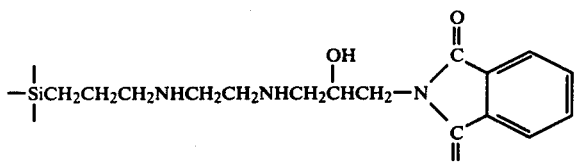

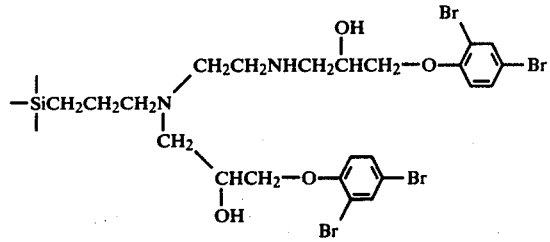

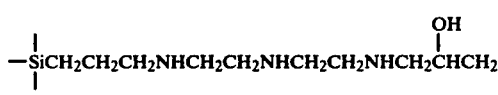

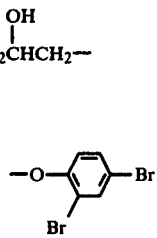

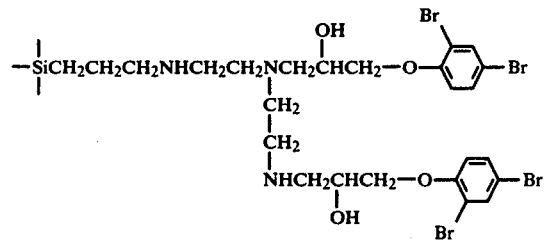

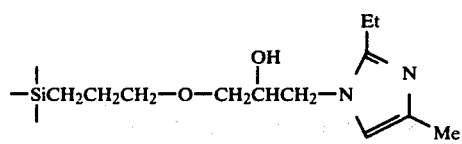

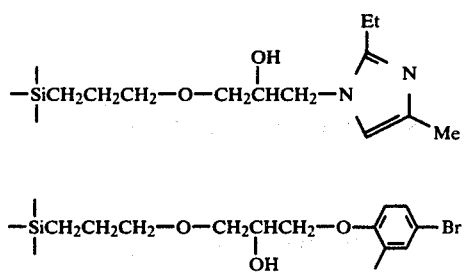

-continued

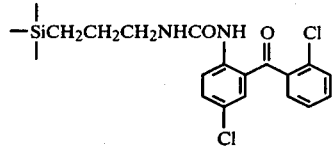

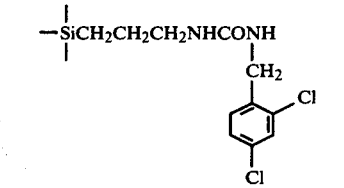

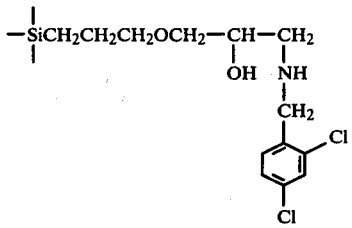

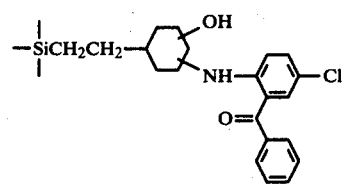

2. The multicomponent membrane of claim 1 wherein the coating contains 2 to 12 parts of said permeation modifying radical per hundred parts of said poly(dimethyl siloxane).

3. The multicomponent membrane of claim 2 wherein the coating is the condensation product of poly(dimethyl siloxane) diol and a permeation modifying agent having the structure $$(R_1)_3 R_2$$

where $R_1$ is methoxy, ethoxy or acetoxy and $R_2$ is said radical.

4. The multicomponent membrane of claim 3 wherein the coating is the condensation product of 100 parts of poly(dimethyl siloxane) diol and 2 to 12 parts of said permeation modifying agent.

5. The coating of claim 4 wherein the coating is the condensation product of 100 parts of poly(dimethyl siloxane) diol and 2 to 12 parts of said permeation modifying agent dissolved in sufficient solvent to form a 0.01 to 5 weight percent solution.

6. The coating of claim 5 wherein said weight percent is 0.05 to 1.

7. The membrane of claim 6 wherein the substrate is made from a polysulfone polymer and is in the form of a hollow fiber.

8. The membrane of claim 7 wherein said substrate has a void volume of 10 to 90 percent and a porosity such that the average pore cross-sectional diameter is 5 to 20,000 Angstroms.

9. The membrane of claim 8 wherein the coating has a thickness of 5,000 Angstroms to 50 microns.

* * * * *